June 17, 1924.　　　　　　　　　　　　　　　1,498,008
J. G. ALEXANDER
GARDEN IMPLEMENT
Filed March 7, 1922
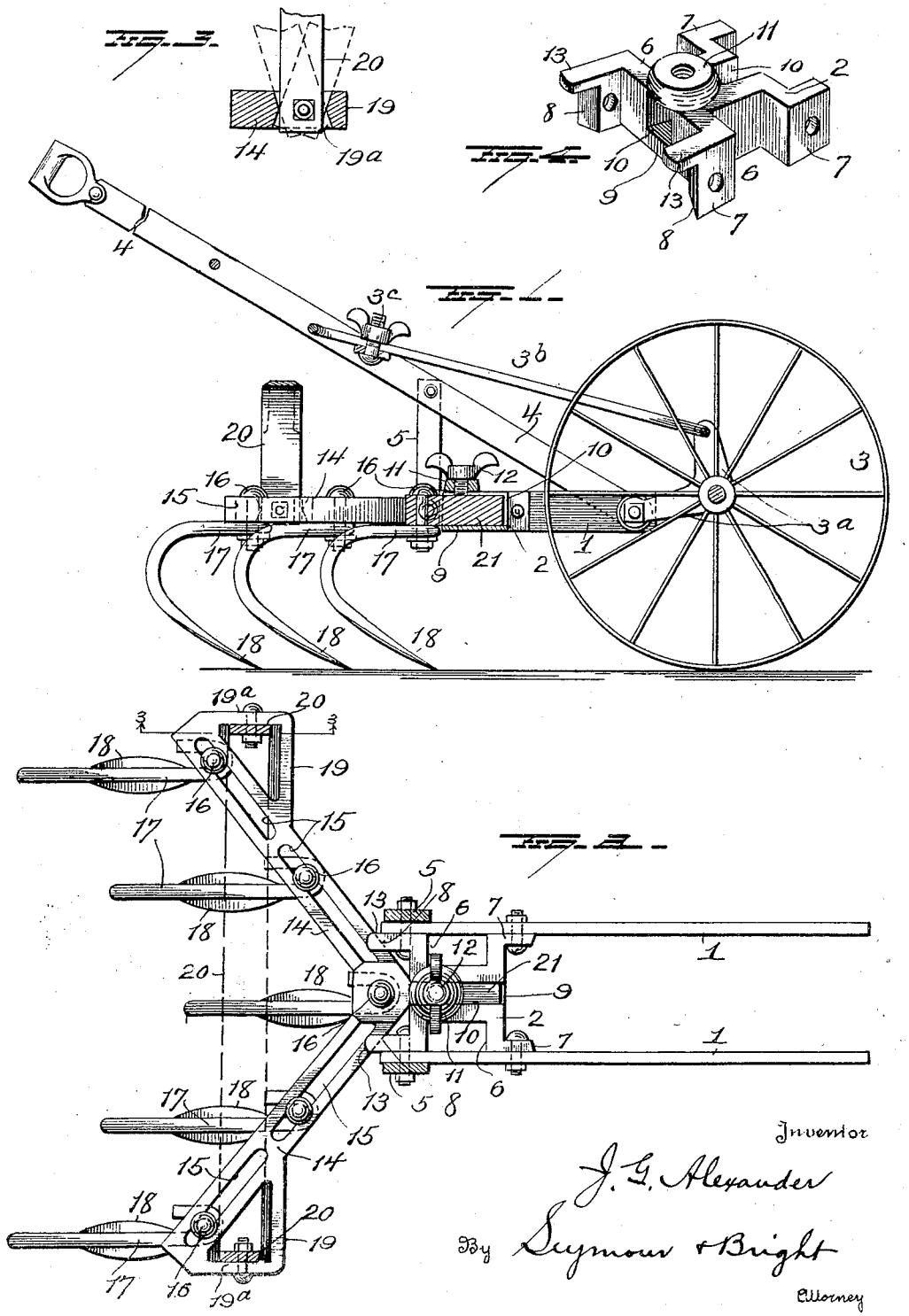
Inventor
J. G. Alexander
By Seymour & Bright
Attorney Patented June 17, 1924.

1,498,008

UNITED STATES PATENT OFFICE.

JAMES G. ALEXANDER, OF AMES, IOWA.

GARDEN IMPLEMENT.

Application filed March 7, 1922. Serial No. 541,717.

*To all whom it may concern:*

Be it known that I, JAMES G. ALEXANDER, a citizen of the United States, and a resident of Ames, in the county of Story and State of Iowa, have invented certain new and useful Improvements in Garden Implements; and I do hereby declare the following to be a full, clear, and exact description of the invention, such as will enable others skilled in the art to which it appertains to make and use the same.

This invention relates to improvements in garden implements, and more particularly to those of the hand-operated, wheel type,—one object of the invention being to improve and simplify the frame construction of such tools and to provide a frame structure which shall be rigid and in which the use of spring side beams shall be avoided.

A further object is to provide simple and efficient means whereby the frame of earth engaging devices may be quickly connected with, disconnected from or shifted relatively to the wheeled or main frame.

With these and other objects in view, the invention consists in certain novel features of construction and combinations of parts as hereinafter set forth and pointed out in the claims.

In the accompanying drawings; Figure 1 is a view partly in side elevation and partly in section showing an embodiment of my invention; Figure 2 is a plan view; Figure 3 is a sectional view on the line 3—3 of Figure 2, and Figure 4 is a perspective view of the bracket 2.

The frame of the implement includes two parallel beams 1, 1, spaced apart and rigidly connected at their rear end portions by a bracket 2, and near the forward end portions of said parallel beams, a ground wheel 3 is connected through the medium of bell-cranks 3ª. Handle bars 4 are connected with the forward end portions of the beams 1 and these handle bars are maintained in proper position by braces 5, 5 secured at their upper ends thereto and at their lower ends to the rear portions of the parallel frame beams 1, 1. Rods 3ᵇ are connected with the upper arms of the bell-cranks 3ª and said rods are adjustably connected with the handles as indicated at 3ᶜ.

The rigid bracket 2 comprises two approximately U-shaped members 6, 6, having flanges 7, 8 lying parallel with and secured to the frame beams 1. The U-shaped members are connected at their bottom edges by a cross member 9 and the body portions of said U-shaped members are so spaced apart as to provide an elongated socket 10 between them,—which socket is open at its ends and closed at its bottom by the cross member 9. A top cross member 11 (which may be circular in form) extends across the top of the socket 10 from one member to the other and the said top member is provided with a central hole having a threaded wall for the accommodation of a set screw 12. The rear flanges 8 of the respective bracket members 6 are provided at their upper edge portions with rearwardly projecting fingers 13 for a purpose hereinafter explained.

In the embodiment of my invention herein shown and described, I employ a cultivator frame 14 having a general V-shape provided with slots 15 for the accommodation of bolts 16 for adjustably securing the hooked shanks 17 of earth-engaging devices 18 in place and at the apex of said cultivator frame, a hole is provided for the accommodation of the bolt which secures the shank of the central earth-engaging device in place. At or near the free ends of the radiating members comprising the cultivator frame, V-shaped brackets 19 are provided and so disposed that the outer arms 19ª of said brackets shall be in planes parallel with the line of draft of the frame. With the arms 19ª of the respective brackets 19, arms at respective ends of a double-edged scraper 20, are so connected (within said brackets) as to permit limited rocking movement of the scraper, as shown in Figure 3.

At the apex of the cultivator frame, a forwardly projecting, rectangular shank 21 is provided to enter the rectangular socket 10 of the bracket 2 and is secured in such socket by means of the set screw 12 and when the cultivator frame is thus connected with the main frame of the tool, the arms or radiating members of the cultivator frame will engage beveled ends of the flanges 8 of the bracket 2, and the fingers 13 on said flanges will overlie said cultivator arms or members and resist any upward or twisting strains to which the cultivator frame may be subjected.

It will be understood that the tool shown in the drawings may be used either as a cultivator or scraper, and that it may be easily and quickly converted from one to the other, by removing the frame 14 from the bracket 2 (after loosening the set screw 12) and, after inverting it, replacing the shank 21 in position in said bracket and tightening the set screw 12.

The main frame construction herein shown and described is also adapted to receive other earth-engaging devices than a combined cultivator and scraper,—such, for example, a planter structure.

Various slight changes might be made in the details of construction of my invention without departing from the spirit thereof or limiting its scope and hence I do not wish to restrict myself to the precise details herein set forth.

Having fully described my invention what I claim as new and desire to secure by Letters-Patent :—

1. In an implement of the character described, the combination of a main frame comprising frame beams and a bracket secured between the rear portions of said frame beams and having a horizontal angular socket, a reversible frame for carrying earth-engaging means, an angular shank projecting forwardly in a horizontal direction from said last-mentioned frame and removably entering the horizontal angular socket in said bracket, and means for securing said shank to said bracket.

2. In an implement of the character described, the combination of a frame comprising frame beams and a socketed bracket rigidly secured to and between the rear portions of said beams, said bracket having rearwardly projecting fingers, a frame for carrying earth-engaging devices and having a shank entering the socket of said bracket, means for securing said shank in said socket, parts of said last-mentioned frame underlying the rearwardly projecting fingers of said bracket.

3. In an implement of the character described, the combination of frame beams, a fixed bracket between the rear portions of said beams, said bracket comprising two connected members forming an angular socket between them and a top member over said socket, a frame for an earth-engaging means, provided with an angular shank removably entering said angular socket, and a set screw passing through the top member of said bracket to engage said shank.

4. In an implement of the character described, the combination with a main frame, of a cultivator frame comprising radiating members to receive cultivator tools, brackets projecting forwardly from the rear portions of said radiating members, each of said brackets having a part parallel with the line of draft of the implement, and a scraper having arms at its ends pivotally connected with the above-mentioned parts of said brackets and within the latter and capable of limited rocking movement.

In testimony whereof, I have signed this specification in the presence of two subscribing witnesses.

JAMES G. ALEXANDER.

Witnesses:
C. A. FORDYCE,
JOHN STERNS.